United States Patent [19]
Pettit, Jr. et al.

[11] Patent Number: 5,182,337
[45] Date of Patent: Jan. 26, 1993

[54] POWDER COATING COMPOSITION COMPRISING A CO-REACTABLE PARTICULATE MIXTURE OF CARBOXYLIC ACID GROUP-CONTAINING POLYMERS AND BETA-HYDROXYALKYLAMIDE CURING AGENT

[75] Inventors: Paul H. Pettit, Jr., Allison Park; Debra L. Singer; Marvin L. Kaufman, both of Pittsburgh, all of Pa.

[73] Assignee: PPG Industries, Inc., Pittsburgh, Pa.

[21] Appl. No.: 777,455

[22] Filed: Oct. 16, 1991

Related U.S. Application Data

[60] Continuation of Ser. No. 503,002, Apr. 2, 1990, abandoned, which is a division of Ser. No. 408,420, Sep. 18, 1989, Pat. No. 4,937,288, which is a continuation of Ser. No. 139,488, Dec. 30, 1987, abandoned, which is a continuation-in-part of Ser. No. 912,463, Sep. 29, 1986, Pat. No. 4,727,111.

[51] Int. Cl.$^5$ ............................................... C08L 67/02
[52] U.S. Cl. .................................... 525/176; 525/175; 525/934
[58] Field of Search .................. 525/176, 934, 175

[56] References Cited

U.S. PATENT DOCUMENTS

| | | | |
|---|---|---|---|
| 3,857,905 | 12/1974 | Blackley et al. | 525/166 |
| 4,076,917 | 2/1978 | Swift et al. | 526/15 |
| 4,346,144 | 8/1982 | Craven | 525/161 |
| 4,889,890 | 12/1989 | Kerr et al. | 525/113 |

FOREIGN PATENT DOCUMENTS 47457 4/1981 Japan.

*Primary Examiner*—James J. Seidleck
*Assistant Examiner*—W. R. H. Clark
*Attorney, Agent, or Firm*—Daniel J. Long; William J. Uhl

[57] ABSTRACT

A thermosetting powder coating composition which has good handling properties and which has a good blend of physical properties such as appearance, flexibility, hardness, solvent resistance, corrosion resistance and exterior durability is disclosed. The composition comprises a co-reactable particulate mixture of a carboxylic acid group-containing acrylic polymer, a second carboxylic acid group-containing polyester having sufficient crystallinity to assist in flow of the powder coating compositions, a beta-hydroxyalkylamide crosslinking agent and an amorphous acid group-containing polyester.

8 Claims, No Drawings

POWDER COATING COMPOSITION COMPRISING A CO-REACTABLE PARTICULATE MIXTURE OF CARBOXYLIC ACID GROUP-CONTAINING POLYMERS AND BETA-HYDROXYALKYLAMIDE CURING AGENT

This application is a continuation of application Ser. No. 07/503,002 filed Apr. 2, 1990, now abandoned, which is a division of application Ser. No. 07/408,420 filed Sep. 18, 1989, now U.S. Pat. No. 4,937,288, which is a continuation of application Ser. No. 07/139,488 filed Dec. 30, 1987, no abandoned, which is a continuation-in-part of application Ser. No. 06/912,463 filed Sep. 29, 1986, now U.S. Pat. No. 4,727,111.

The present invention relates to thermosetting powder coating compositions and more particularly to powder coating compositions which have good exterior durability.

BACKGROUND OF THE INVENTION

Powder coating compositions for use in painting are extremely desirable. Such coating compositions greatly reduce and can even eliminate the organic solvents used in liquid paints. When the powder coating composition is cured by heating, little, if any, volatile material is given off to the surrounding environment. This is a significant advantage over liquid paints in which organic solvent is volatilized into the surrounding atmosphere when the paint is cured by heating.

For exterior durability, the powder coating composition is usually formulated with an acrylic polymer. One common curing mechanism for obtaining powder coating compositions with good exterior durability is based on reaction between an acid group-containing acrylic polymer and a triglycidyl isocyanurate (TGIC) curing agent. Although powder coating compositions using these materials give coatings with good exterior durability, they are expensive to formulate because of the TGIC, often have poor stability, and often give coatings which are deficient in other physical properties.

SUMMARY OF THE INVENTION

In accordance with the present invention, a thermosetting powder coating composition is provided The composition comprises:
(a) a first carboxylic acid group-containing acrylic polymer having a Tg in the range of 35° C. to 100° C.,
(b) a second carboxylic acid group-containing material for assisting flow of the powder coating composition, and
(c) a beta-hydroxyalkylamide curing agent.

The second carboxylic acid group-containing material can be selected from the group consisting of $C_4$ to $C_{20}$ aliphatic dicarboxylic acids, polymeric polyanhydrides, or low molecular weight polyesters having an acid equivalent weight from about 150 to about 750 and mixtures thereof. Preferably, the second carboxylic acid group-containing material is crystalline.

In one embodiment the composition comprises:
(a) a carboxylic acid group-containing acrylic polymer having a Tg in the range of 35° C. to 100° C.,
(b) a crystalline carboxylic acid group-containing polyester having a number average molecular weight from about 300 to about 1,500 and an acid equivalent weight of from about 150 to about 750, and
(c) a beta-hydroxyalkylamide.

The powder coating compositions have good stability, i.e., do not clump when exposed to heat, and give coatings with good exterior durability and a good blend of other physical properties such as good appearance, flexibility, hardness, solvent resistance and corrosion resistance.

DETAILED DESCRIPTION OF THE INVENTION

The powder coating compositions of the present invention comprise an intimate mixture of several materials. There are three essential ingredients in the powder coating composition, namely, a carboxylic acid group-containing acrylic polymer, a second carboxylic acid group-containing material, preferably crystalline material, selected from the group consisting of an aliphatic polycarboxylic acid, a polymeric polyanhydride, a low molecular weight carboxylic acid group-containing polyester and mixtures thereof, and a beta-hydroxyalkylamide material as a curing agent.

The acid group-containing acrylic polymer preferably has a number average molecular weight of about 1,500 to 15,000, preferably 1,800 to 6000, and a glass transition temperature (Tg) in the range of 35° Celsius (C) to 100° C., preferably about 45° C. to 70° C. The acrylic polymer provides for hardness, gloss, durability and solvent resistance in the resultant coating.

The molecular weights of the acrylic polymer are determined by gel permeation chromatography (GPC) using a polystyrene standard. Therefore, it is not the actual molecular weight which is measured but an indication of the molecular weight as compared to polystyrene. The values which are obtained are commonly referred to as polystyrene numbers; however, for the purposes of this application, they are referred to as molecular weights. If the number average molecular weight is below 1500, the solvent resistance and mechanical strength of the resultant coating may be poor. If the molecular weight is higher than 15,000, the melt flow of the polymer is low and the coating may have poor appearance.

The Tg of the polymer is a measure of the hardness and melt flow of the polymer. The higher the Tg, the less the melt flow and the harder the coating. Tg is described in PRINCIPLES OF POLYMER CHEMISTRY (1953), Cornell University Press. The Tg can be actually measured or it can be calculated as described by Fox in *Bull. Amer. Physics Soc.*, 1, 3, page 123 (1956). Tg as used herein refers to actually measured values. For measurement of the Tg of the polymer, differential scanning calorimetry can be used (rate of heating 10° C. per minute, Tg taken at the first inflection point).

If the glass transition temperature is below 35° C., the polymer tends to be sticky and difficult to handle. If the glass transition temperature is greater than 100° C., the melt flow of the polymer is low and the coating may have poor appearance.

The carboxylic acid group-containing acrylic polymer can be formed by reacting a polymerizable alpha, beta-ethylenically unsaturated carboxylic acid with one or more other polymerizable alpha, beta-ethylenically unsaturated monomers, particularly vinyl aromatic monomers and esters of alpha, beta-ethylenically unsaturated carboxylic acids.

Examples of the carboxylic acid group-containing monomers which can be used are acrylic acid and methacrylic acid, which are preferred, as well as crotonic acid, itaconic acid, fumaric acid, maleic acid, citraconic acid, and the like, as well as monoalkylesters of unsaturated dicarboxylic acids. The acid group-containing monomer is preferably present in the acrylic polymer in amounts of about 6 to 25 percent by weight, more preferably from about 8 to 18 percent by weight based on total weight of the monomers. Amounts less than 6 percent by weight may result in poor solvent resistance and poor mechanical strength of the coating.

Examples of vinyl aromatic compounds are monofunctional vinyl aromatic compounds such as styrene, which is preferred, and alkyl-substituted styrenes such as alpha-methylstyrene and chloro-substituted styrene such as chlorostyrene. The vinyl aromatic monomer is preferably present in the acrylic polymer in amounts of about 5 to 45, more preferably from about 10 to 40 percent by weight based on total weight of the monomers. Amounts greater than 45 percent by weight may result in poor exterior durability.

Examples of esters of alpha, beta-ethylenically unsaturated acids are esters of acrylic acid and methacrylic acid and include methyl acrylate, ethyl acrylate, butyl acrylate, 2-ethylhexyl acrylate, dodecyl acrylate, methyl methacrylate, ethyl methacrylate, N-butyl methacrylate, 2-ethylhexyl methacrylate and the like. Preferably, these esters are present in the acrylic polymer in amounts of about 5 to 70, more preferably from about 10 to 50 percent by weight based on total weight of the monomers. Preferably, the esters of the alpha, beta-ethylenically unsaturated acids are a mixture of $C_1$ to $C_2$ alkyl esters and $C_4$ to $C_{20}$ alkyl esters, such as a mixture of methyl methacrylate and butyl acrylate. Preferably, the $C_4$ to $C_{20}$ alkyl ester is present in amounts of about 5 to 40, more preferably about 10 to 20 percent by weight based on total weight of monomers. Amounts less than 5 percent by weight may result in coatings with poor flexibility and impact resistance, whereas amounts greater than 40 percent by weight may cause stability problems in the coating composition. The $C_1$ to $C_2$ alkyl ester is preferably present in amounts of about 15 to 80, more preferably 30 to 60 percent by weight based on total weight of monomers. Amounts less than 15 percent by weight may result in coatings with poor hardness and durability, whereas amounts greater than 80 percent by weight may result in coatings with poor flexibility.

In addition to the vinyl aromatic compounds and esters of acrylic acid and methacrylic acid, other ethylenically unsaturated copolymerizable monomers may be used. Examples include nitriles such as acrylonitrile, vinyl and vinylidene halides such as vinyl chloride and vinylidene fluoride and vinyl esters such as vinyl acetate. These additional monomers are present in amounts of 0 to about 40, preferably from 0 to about 30 percent by weight based on total weight of monomers.

In preparing the acid group-containing acrylic polymer, the various monomers are mixed together and are reacted by conventional free radical initiated polymerization processes. Among the free radical initiators which may be used are benzoyl peroxide, tertiarybutyl hydroperoxide, ditertiarybutyl peroxide, azobis(2-methylpropionitrile) and so forth. Chain transfer agents such as mercaptopropionic acid can also be used. The polymerization is preferably carried out in solution using a solvent in which the monomers are soluble such as toluene or xylene. At the completion of the polymerization, the reaction mixture is devolatilized such as by placing it under vacuum to remove the organic solvent and recovering the polymer as a solid material. Alternately, the polymer can be precipitated and subsequently dried. Usually the devolatized polymer will contain less than 1 percent by weight of materials that volatilize at the temperatures used for curing the coatings.

The acid group-containing acrylic polymer can also be prepared by emulsion polymerization, suspension polymerization, bulk polymerization or suitable combinations thereof. These techniques are well known in the art. Besides free radical-initiated polymerization, other means of polymerization such as group transfer and anionic polymerization can be used to prepare the acrylic polymer.

The acid group-containing acrylic polymer is preferably used in amounts of about 35 to 85, more preferably about 40 to 75 percent by weight based on total weight of resin solids. Amounts less than 35 percent by weight are not preferred because of tendencies to poor hardness, durability and solvent resistance in the resultant coating. Amounts greater than 85 percent by weight may result in coatings with poor flexibility and impact strength.

Besides the carboxylic acid group-containing acrylic polymer, the thermosetting powder coating composition of the invention preferably contains a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750 and mixtures thereof. The second carboxylic acid group-containing material is crystalline and more preferably is the low molecular weight crystalline carboxylic acid group-containing polyester. These materials are desirable because they provide for flexibility and impact resistance in the resultant coating and also assist in the flow during cure thereby providing for smooth, glossy coatings. The low molecular weight polyester further provides for less yellowing in the resultant coating.

The amount of the second carboxylic acid group-containing material, preferably the low molecular weight crystalline polyester, which is used can vary from about 1 to 25, preferably from about 5 to 20 percent by weight based on the total weight of resin solids. Amounts greater than 25 percent by weight are undesirable because of a tendency to cause poor stability in the powder coating composition, whereas amounts less than 1 percent by weight are undesirable because of tendencies toward poor flow and poor flexibility in the coating.

Among the aliphatic polycarboxylic acids which may be used include dicarboxylic acids, specifically adipic acid, suberic acid, azelaic acid, sebacic acid and dodecanedioic acid. Preferably, the aliphatic dicarboxylic acid contains an even number of carbon atoms and is a solid at room temperature. Dodecanedioic acid is preferred.

The polymeric polyanhydride includes those of the structure:

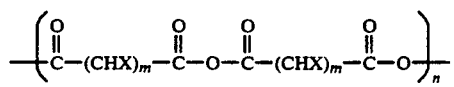

where X is equal to H, $CH_3$, $C_2H_5$ and m equals 4 to 12 and n is of such a value that the molecular weight of the polymeric polyanhydride is in the range of about 400 to 2,500, preferably about 600 to 1,200 on a number average basis. Molecular weights greater than 2,500 are undesirable because of a tendency to cause poor stability in the coating composition. Examples of suitable polymeric polyanhydrides are poly(adipic anhydride), poly(azelaic anhydride), poly(sebacic anhydride), poly(dodecanedioic anhydride) and mixed acid anhydrides.

The polymeric polyanhydride can be prepared by heating the acid precursor from which the anhydride is derived with a simple anhydride such as acetic anhydride and removing the evolved acid (acetic) which is generated under vacuum. Preferably, the acid contains an even number of carbon atoms.

The low molecular weight carboxylic acid group-containing polyester generally has an acid equivalent weight from about 150 to about 750. Such a polyester is crystalline and generally has a number average molecular weight from about 300 to about 1,500. The low molecular weight polyesters which may be used include condensation products of aliphatic polyols, preferably aliphatic diols, and aliphatic and/or aromatic polycarboxylic acids, preferably dicarboxylic acids. Examples of suitable aliphatic polyols include ethylene glycol (1,2-ethanediol), propylene glycol (1,3-propanediol), butylene glycol (1,4-butanediol), 1,6-hexanediol neopentyl glycol, cyclohexane dimethanol, trimethylolpropane and the like. Preferably, the aliphatic polyol is a diol such as ethylene glycol, propylene glycol, butylene glycol or 1,6-hexanediol. Suitable polycarboxylic acids include aliphatic dicarboxylic acids preferably $C_4$ to $C_{20}$ dicarboxylic acids such as adipic acid, azelaic acid, sebacic acid, dodecanedioic acid, succinic acid, undecanedioic acid, and aromatic dicarboxylic acids such as terephthalic acid, isophthalic acid, and phthalic acid. Preferably, the polycarboxylic acid is an aliphatic dicarboxylic acid containing from about 6 to 12 carbon atoms. Mixtures of such polycarboxylic acids or aliphatic polyols may also be used.

The ingredients are reacted together at an equivalent ratio of diol to diacid of from about 1:2 to about 2:3, preferably at about 1:2 so as to control the molecular weight in the range from about 300 to about 1,500 (number average). The resultant low molecular weight polyester has an acid number of about 75 to about 375 (i.e., an acid equivalent weight of about 150 to about 750) and is a crystalline solid at room temperature. Further, the resultant crystalline polyester material has a melting range of from about 50° C. to about 110° C., preferably from about 70° C. to about 110° C. The molecular weights of the polyester are determined by GPC using a polystyrene standard.

Besides the carboxylic acid group-containing materials described above, other optional polycarboxylic acid group-containing materials can be included in the composition, e.g., amorphous carboxylic acid group-containing polyesters or carboxylic acid group-containing polyurethanes.

The amorphous carboxylic acid group-containing polyester can contribute flexibility, impact resistance and corrosion resistance to coatings deposited from the compositions of the present invention. Among the carboxylic acid group-containing polyesters which may be used are those based on condensing aliphatic including cycloaliphatic polyols with aliphatic and/or aromatic polycarboxylic acids and anhydrides. Examples of suitable aliphatic polyols include ethylene glycol, propylene glycol, butylene glycol, 1,6-hexylene glycol, neopentyl glycol, cyclohexanedimethanol, trimethylolpropane and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

These ingredients are reacted together with an excess of acid and alcohol so as to form a polyester which has free carboxylic acid groups. Preferably, on a resin solids basis, the carboxylic acid group-containing polyester will have an acid number of about 15 to 100 and will be a solid at room temperature. If the polyester is present in the composition, it is present in amounts of about 5 to 40 percent by weight, preferably about 15 to 35 percent by weight based on weight of resin solids. Amounts greater than 40 percent by weight are undesirable because of tendencies towards poor solvent resistance in the coating.

The amorphous carboxylic acid group-containing polyurethanes can contribute durability to the resultant coating. The polyurethane can be prepared by reacting polyols and polyisocyanates so as to form a polyurethane polyol which is then reacted with polycarboxylic acid or anhydride to introduce free carboxyl groups into the reaction product. Examples of polyols include those mentioned above in connection with the preparation of the polyester. Examples of polyisocyanates are aromatic and aliphatic polyisocyanates with the aliphatic polyisocyanates being preferred because of better exterior durability. Specific examples include 1,6-hexamethylene diisocyanate, isophorone diisocyanate and 4,4′-methylene-bis-(cyclohexyl isocyanate). Examples of suitable polycarboxylic acids are those mentioned above in connection with the preparation of the polyester. Preferably, the carboxylic acid group-containing polyurethane has an acid number on a resin solids basis of about 15 to 100 and will be a solid at room temperature. If the polyurethane is used, it is used in amounts of about 5 to 40 percent by weight, preferably about 15 to 35 percent by weight based on total weight of resin solids. Amounts greater than 40 percent by weight are undesirable because of poor stability in the powder coating composition.

The beta-hydroxyalkylamides are curing agents for the composition. They provide a crosslinked polymer network which is hard, durable, corrosion resistant and solvent resistant. It is believed the hydroxyalkylamides cure the coating through an esterification reaction with the carboxy-containing compounds forming multiple ester crosslinks. The hydroxyl functionality of the hydroxyalkylamide should be on an average basis at least 2, preferably greater than 2, and more preferably from greater than 2, up to and including 4, in order to obtain an optimum curing response.

The beta-hydroxyalkylamide curing agents can be depicted structurally as follows:

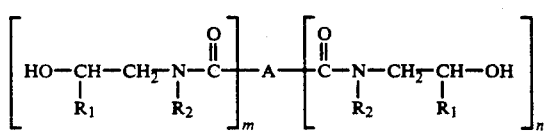

where $R_1$ is H or $C_1$-$C_5$ alkyl; $R_2$ is H, $C_1$-$C_5$ alkyl or

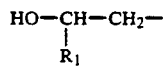

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms. Preferably, A is an alkylene radical —$(CH_2)_x$— where X is equal to 2 to 12, preferably 4 to 10; m is equal to 1 to 2 and n is equal to 0 to 2 and m+n is at least 2, preferably greater than 2, usually within the range from greater than 2 up to and including 4.

The beta-hydroxyalkylamides can be prepared by reacting a lower alkyl ester or mixture of esters of carboxylic acids with a beta-hydroxyalkylamine at a temperature ranging from ambient temperature up to about 200° C. depending on the choice of reactants and the presence or absence of catalyst. Suitable catalysts are basic catalysts including, e.g., sodium methoxide, potassium methoxide, sodium butoxide, potassium butoxide, sodium hydroxide, and potassium hydroxide present in amounts of about 0.1 to about 1 percent by weight based on weight of alkyl ester.

To bring about effective cure of the composition, the equivalent ratio of beta-hydroxyalkylamide (hydroxy equivalents) to carboxy-containing materials (carboxylic acid equivalents and any anhydride equivalents, each anhydride equivalent counting as two carboxy groups) is preferably from about 0.6 to 1.6:1, more preferably from about 0.8 to 1.3:1. Ratios outside the range of about 1.6 to 0.6:1 are undesirable because of poor cure.

In order to give the powder coating composition a suitable color, a pigment can be included in the coating composition typically in amounts of from about 1 to 50 percent by weight based on total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quindo red.

The coating composition may also contain certain other additives that are typically incorporated into powder coating compositions. Particularly recommended are degassing agents which allow volatiles to escape from the film during baking and flow control agents which prevent cratering of the finish. Benzoin is a highly preferred degassing agent and when used is present in amounts ranging from about 0.5 to 3 percent by weight based on total weight of the composition.

One group of suitable flow control agents are acrylic polymers such as polylauryl acrylate, polybutyl acrylate, poly(2-ethylhexyl) acrylate, poly(ethyl-2-ethylhexyl) acrylate, polylauryl methacrylate and polyisodecenyl methacrylate. The flow control agent may also be a fluorinated polymer such as an ester of polyethylene glycol or polypropylene glycol and fluorinated fatty acids, for example, an ester of polyethylene glycol of a molecular weight of over 2,500 and perfluorooctanoic acid. Polymeric siloxanes of molecular weights over 1,000 may also be used as a flow control agent, for example, poly(dimethylsiloxane) or poly(methylphenyl)siloxane. The flow control agent when used is present in amounts of about 0.5 to 5 percent by weight based on total weight of the coating composition.

For good exterior durability, the compositions also preferably contain U.V. absorbing agents and antioxidants. Such materials are commercially available from Ciba-Geigy under the trademarks TINUVIN and IRGANOX. The U.V. absorbing agents and antioxidants when used are typically present in the compositions individually in amounts of about 1.5 to 6 percent by weight based on weight of resin solids.

The thermosetting powder coating compositions are prepared by melt blending the ingredients of the coating compositions. This can be accomplished by first blending in a high-intensity mixer, e.g., a Wellex mixer, and then melt blending in an extruder at a temperature of about 80° C. to 130° C. The extrudate is then cooled and particulated into a powder. The powder coating composition can then be applied directly to metal such as steel or aluminum, glass, plastic or fiber-reinforced plastic substrates.

Application of the powder can be by electrostatic spraying or by the use of a fluidized bed. Preferred is electrostatic spraying. The powder composition can be applied in one pass or in several passes to provide a film thickness after cure of about 0.5 to 5 mils. Preferably, to provide a high quality finish at reasonable cost, the thickness of the powder coat is about 1.2 to 4 mils, preferably about 1.4 to 3 mils.

The substrate to be coated can optionally be preheated prior to application of the powder to promote more uniform powder deposition. Upon application of the powder, the powder-coated substrate is baked typically at 300° F. to 400° F. (149° C. to 204° C.) for about 20 to 60 minutes.

The present invention will be more fully understood from the following illustrative examples wherein all quantities, percentages and ratios are on a weight basis unless otherwise indicated.

The following examples (A-N) show the preparation of various carboxylic acid group-containing acrylic polymers, polymeric polyanhydrides, low molecular weight carboxylic acid group-containing polyesters, amorphous carboxylic acid group-containing polyesters, carboxylic acid group-containing polyurethanes and hydroxyalkylamide curing agents which are used in preparing thermosetting powder coating compositions.

EXAMPLE A

A carboxylic acid group-containing acrylic polymer was prepared from the following ingredients:

| Ingredients | Parts by Weight (grams) |
|---|---|
| Reactor Charge | |
| Xylene | 2400 |
| Initiator Charge | |
| Ditertiarybutyl peroxide | 111.0 |
| Xylene | 189.0 |
| Monomer Charge | |
| Styrene | 832.5 (15%) |
| Methyl mathacrylate | 3269.0 (58.9%) |
| Butyl acrylate | 754.8 (13.6%) |
| Methacrylic acid | 693.7 (12.5%) |
| Mercaptopropionic acid | 138.8 |

The reactor charge was heated under a nitrogen atmosphere to reflux. The initiator charge and monomer charge were then added slowly and simultaneously to the reactor charge over a period of about three hours while keeping the reaction mixture at reflux. After the feeds of the initiator charge and monomer charge were completed, the reaction mixture was held for two hours at reflux. The reaction mixture was then heated under vacuum to remove solvent. The resultant reaction product had a solids content of 99.7 percent (measured at 150° C. for two hours), an acid value of 58.8, a number average molecular weight of 2,207 and a weight average molecular weight of 7,737; the molecular weights being determined by gel permeation chromatography using a polystyrene standard.

EXAMPLE B

An acrylic polymer similar to Example A but containing different percentages by weight styrene and methyl methacrylate was pared from the following ingredients:

| Ingredients | Parts by Weight (grams) |
| --- | --- |
| Reactor Charge | |
| Xylene | 800.0 |
| Initiator Charge | |
| Ditertiarybutyl peroxide | 92.5 |
| Xylene | 157.5 |
| Monomer Charge | |
| Styrene | 1618.8 (35%) |
| Methyl methacrylate | 1798.9 (38.9%) |
| Butyl acrylate | 629.0 (13.6%) |
| Methacrylic acid | 578.3 (12.5%) |
| Mercaptopropionic acid | 115.8 |

The polymer was prepared as generally described above for Example A. The polymer after vacuum stripping had a solids content of 99.8 percent, an acid value of 79.3, a number average molecular weight of 2,317 and a weight average molecular weight of 7,980.

EXAMPLE C

A carboxylic acid group-containing acrylic polymer was prepared from the following ingredients:

| Ingredients | Parts by Weight (grams) | |
| --- | --- | --- |
| Reactor Charge | | |
| Xylene | 800.0 | |
| Initiator Charge | | |
| Ditertiarybutyl peroxide | 40.0 | |
| Xylene | 85.0 | |
| Monomer Charges A and B | | |
| | Charge A | Charge B |
| Styrene | 150.0 | 150.0 |
| Methyl methacrylate | 585.0 | 585.0 |
| Butyl acrylate | 196.0 | 84.0 |
| Methacrylic acid | 78.8 | 146.2 |
| Mercaptopropionic acid | 26.8 | 23.2 |
| Chaser Addition | | |
| Methacrylic acid | 25.0 | |
| Xylene | 125.0 | |
| Rinse | | |
| Xylene | 100.0 | |
| Post Addition | | |
| MODAFLOW III[1] | 6.0 | |
| Xylene | 6.0 | |

[1]MODAFLOW III is a poly (2-ethylhexyl-ethyl)acrylate on a silica carrier available from Monsanto Corporation.

The reactor charge was heated under a nitrogen atmosphere to reflux. The initiator charge and monomer Charge A were then added slowly and simultaneously to the reactor. After about 1½ hours, addition of monomer Charge A was completed and monomer Charge B was started. After another 1½ hours, addition of monomer Charge B was completed. The chaser addition was then added over 15 minutes at which time the addition of the initiator charge was completed. The rinse was added and reflux of the reaction mixture was continued for two hours. The reaction mixture was then heated to reflux, the post addition mixture added and heating continued under vacuum to remove solvent. The resultant product had a solids content of about 99.8 percent, an acid value of 77.4, and a number average molecular weight of 3118.

EXAMPLE D

Poly(dodecanedioic anhydride) was prepared from the following ingredients:

| Ingredients | Parts by Weight (grams) |
| --- | --- |
| Dodecanedioic acid | 3105.0 |
| Acetic anhydride | 918.0 |

The ingredients were charged to a reactor and heated under a nitrogen atmosphere to 125° C. Reaction was continued at this temperature for about four hours while vacuum stripping the evolving acetic acid. The temperature was then raised to 150° C. and held at this temperature for about one hour. The vacuum source was then removed and the reaction mixture cooled to room temperature to give a white solid reaction product. Solids content was 97.6 and measured at 110° C. for two hours.

EXAMPLE E

An acid functional polyester was prepared from the following mixture of ingredients:

| Ingredients | Parts by Weight (grams) |
| --- | --- |
| Neopentyl glycol | 2137 |
| Cyclohexanedimethanol | 893 |
| Terephthalic acid | 700 |
| Isophthalic acid | 2560 |
| Trimellitic anhydride | 280 |
| Dibutyltin oxide (catalyst) | 7 |
| Hexahydrophthalic anhydride | 1190 |

The neopentyl glycol, cyclohexanedimethanol, terephthalic acid, isophthalic acid, trimellitic anhydride and dibutyltin oxide were charged to a reaction vessel and heated to 200° C. under a nitrogen atmosphere and held at that temperature for one-half hour while constantly distilling water. The reaction mixture was then heated to 230° C. and held at that temperature until an acid value of about five was obtained. The reaction mixture was then cooled to 140° C. followed by the addition of the hexahydrophthalic anhydride. The reaction mixture was maintained at 140° C. until IR analysis indicated the disappearance of anhydride functionality. The reaction mixture was then cooled to room temperature to give a reaction product having a solids content of 100 percent (measured for two hours at 110° C.), an acid number of 66.2 and a hydroxyl value of 19.9.

EXAMPLE F

An acid functional polyurethane was prepared from the following mixture of ingredients:

| Ingredients | Parts by Weight (grams) |
| --- | --- |
| Methylisobutyl ketone | 2699.7 |
| 1,6-hexanediol | 1940.7 |

-continued

| Ingredients | Parts by Weight (grams) |
|---|---|
| Dibutyltin dilaurate | 0.6 |
| DESMODUR W[1] | 3447 |
| Hexahydrophthalic anhydride | 911.8 |

[1] 4,4'-methylene-bis(cyclohexyl isocyanate) obtained from Mobay Company.

The methylisobutyl ketone, 1,6-hexanediol and dibutyltin dilaurate were charged to a reaction vessel and heated under a nitrogen atmosphere to 70° C. The DESMODUR W was added dropwise to the reaction mixture over a six-hour period while maintaining the temperature of the reaction mixture at 70° C. After the DESMODUR W addition was completed, the reaction mixture was heated to 90° C. and maintained at this temperature until IR analysis indicated the disappearance of NCO functionality. The hexahydrophthalic anhydride was then added and the reaction mixture maintained at about 90° C. for about two hours. The reaction mixture was then heated under vacuum to remove solvent and then cooled to room temperature to give a solid reaction product which had a solids content (two hours at 150° C.) of 73.2, an acid value of 39.7, a number average molecular weight of 2,054 and a weight average molecular weight of 7,015.

EXAMPLE G

An acid functional polyester was prepared from the following ingredients:

| Ingredients | Parts by Weight (grams) |
|---|---|
| 1,6-hexanediol | 118 |
| Dodecanedioic acid | 460 |
| Dibutyltin oxide | 0.58 |
| Xylene | 144.6 |

The ingredients were charged to a reactor and heated under a nitrogen atmosphere to reflux (about 140° C.). The reaction mixture was gradually heated to about 165° C. while azeotropically distilling water until an acid value of 163 was obtained. The reaction mixture was then heated at 125° C. under vacuum to remove solvent and then cooled to room temperature to give a solid reaction product which had a solids content of 100 percent (two hours at 140° C.), an acid value of 208, a melting point range of 95° C. to 105° C. and a number average molecular weight of 952.

EXAMPLE H

An acid functional polyester was prepared from the following ingredients:

| Ingredients | Parts by Weight (grams) |
|---|---|
| 1,4-butanediol | 315 |
| Dodecanedioic acid | 1610 |
| Dibutyltin oxide | 1.93 |
| Xylene | 481.3 |

The ingredients were charged to a reactor and heated under a nitrogen atmosphere to reflux (about 140° C.). The reaction mixture was gradually heated to about 163° C. while azeotropically distilling water until an acid value of 170 was obtained. The reaction mixture was then heated at 125° C. under vacuum to remove solvent, followed by cooling to room temperature to give a solid reaction product which had an acid value of 216, a melting point range of 95° C. to 105° C., and a number average molecular weight of 877.

EXAMPLE I

An acid functional polyester was prepared from the following ingredients:

| Ingredients | Parts by Weight (grams) |
|---|---|
| 1,6-hexanediol | 1475 |
| Aliphatic dibasic acid mixture[1] | 5750 |
| Dibutyltin oxide | 7.2 |
| Xylene | 1808.1 |

[1] A mixture containing about 96 percent dodecanedioic acid, 3 percent undecanedioic acid, and 1 percent sebacic acid available as DBD-101 from E. I. DuPont de Nemours.

The ingredients were charged to a reactor and heated under a nitrogen atmosphere to reflux (about 125° C.). The reaction mixture was gradually heated to about 163° C. while azeotropically distilling water until an acid value of about 165 was obtained. Solvent was then removed from the reaction mixture by heating at 125° C. under a vacuum (about 10 millimeters of mercury pressure) followed by cooling to room temperature to give a solid reaction product having an acid value of 202, a melting point range of 73° C. to 105° C. and a number average molecular weight of 1,478.

EXAMPLE J

A carboxylic acid group-containing polyester was prepared from the following ingredients:

| Ingredients | Parts by Weight (grams) |
|---|---|
| Charge 1 | |
| Neopentyl glycol | 928 |
| Cyclohexane dimethanol | 1750 |
| Trimethylolpropane | 315 |
| Hexahydrophthalic anhydride | 3189 |
| Dibutyltin oxide | 7 |
| Charge 2 | |
| Hexahydrophthalic anhydride | 1190 |

Charge 1 was heated to 180° C. in a reaction vessel including a nitrogen sparge. After one-half hour, the reaction mixture was heated to 200° C. and held an additional one-half hour. Next, the charge was heated at about 240° C. until the acid number dropped below a value of 3.0. Then, the reaction mixture was cooled to 150° C.; Charge 2 was added; and the reaction mixture held at about 150° C. for three hours. The resultant product had an acid number of 67.4, a hydroxyl number of about zero, a total solids of 100 percent as measured at 110° C. for two hours and a number average molecular weight of about 1,240.

EXAMPLE K

Bis[N,N-di(beta-hydroxyethyl)]adipamide-glutaramide was prepared from the following mixture of ingredients:

| Ingredients | Parts by Weight (grams) |
|---|---|
| 90/10 weight ratio of dimethyl adipate/dimethyl glutarate | 1038.0 |
| Diethanolamine | 1512.0 |
| Methanolic sodium methoxide | 4.7 (20 ml) |

The ingredients were charged to a reaction vessel and heated to about 100° C. at which point the distillation of methanol began. Reaction was continued while distilling methanol (303 grams) until a temperature of 128° C. was reached. An additional 5 ml of methanolic sodium methoxide was added and heating continued until an additional 5 grams of methanol was obtained. A slight vacuum was applied to the reaction flask and an additional 28 grams of methanol was removed. The methanol distillate was added slowly back into the reaction mixture followed by the addition of 2000 ml of acetone. As the reaction mixture cooled, the hydroxyalkylamide precipitated. The precipitate was filtered, washed with acetone and air dried to yield a reaction product melting at 114° C. to 118° C.

EXAMPLE L

In a manner similar to that of Example F, bis[N,N-di(-beta-hydroxyethyl)]sebacamide was prepared from the following mixture of ingredients:

| Ingredients | Parts by Weight (grams) |
| --- | --- |
| Diethyl sebacate | 129 |
| Diethanolamine | 126 |
| Methanolic sodium methoxide | 4.5 |

The reactants were heated under a nitrogen atmosphere to a temperature to initiate and to continue the distillation of ethanol. After 62 percent of the theoretical amount of ethanol was recovered, 2 grams of methanolic sodium methoxide were added and the reaction mixture heated until 66 percent of the theoretical amount of ethanol was recovered. All of the solvents were stripped under vacuum and the hydroxyalkylamide was crytallized with a methanol/acetone mixture. The reaction product melted at 95° C. to 98° C.

EXAMPLE M

In a manner similar to Example F, bis[N-methyl-N(beta-hydroxyethyl)]adipamide was prepared from the following mixture of ingredients:

| Ingredients | Parts by Weight (grams) |
| --- | --- |
| Diethyl adipate | 161.6 |
| N-methylethanolamine | 150.0 |
| Methanolic sodium methoxide | 5.0 |

The reactants were heated under a nitrogen atmosphere to a temperature to initiate and to continue the distillation of ethanol. After 35 grams of ethanol was recovered, the excess solvents and N-methylethanolamine were removed under vacuum and the hydroxyalkylamide was crystallized with a methanol/acetone mixture. The reaction product melted at 74° C. to 80° C.

EXAMPLE N

Bis[N,N-di(beta-hydroxyethyl)] adipamide-glutaramide was prepared from the following mixture of ingredients:

| Ingredients | Parts by Weight (grams) |
| --- | --- |
| 90/10 weight ratio of dimethyl adipate/dimethyl gluterate | 2491.4 |
| Diethanolamide | 3635.6 |
| Potassium hydroxide | 12.0 |

The ingredients were charged to a reaction vessel and heated to about 100° C. at which point the distillation of methanol began. Reaction was continued while distilling methanol (a total of 590 g) until a temperature of 111° C. was reached. A partial volume (150 millimeters (mm) of mercury) was applied to the reaction vessel and an additional 275 g of methanol was removed. About 865 g of fresh methanol was then added to the reaction vessel, followed by addition of 4,800 milliliters (ml) of acetone. As the reaction mixture cooled, the hydroxyalkylamide precipitated. The precipitate was filtered, washed with acetone and air dried to yield a reaction product melting at 114° C. to 118° C.

The following examples are of thermosetting pigmented powder coating compositions prepared with various carboxylic acid group-containing acrylic polymers, aliphatic dicarboxylic acids, polymeric polyanhydrides, carboxylic acid group-containing polyesters and polyurethanes. The compositions were cured with bis[N,N-di(beta-hydroxyethyl)]adipamide.

EXAMPLE 1

A pigmented powder coating composition was prepared from the following mixture of ingredients:

| Ingredients | Parts by Weight (grams) |
| --- | --- |
| Carboxylic acid group-containing acrylic polymer of Example B | 500.0 (45.0%) |
| Poly(dodecanedioic anhydride) of Example C | 75.0 (6.8%) |
| Carboxylic acid group-containing polyester of Example D | 360.0 (32.4%) |
| Beta-hydroxyalkylamide of Example F | 176.0 (15.8%) |
| Titanium dioxide | 200.0 |
| Carbon black | 4.6 |
| Ferrite yellow | 6.4 |
| Benzoin | 8.8 |
| MODAFLOW III[1] | 11.9 |
| IRGANOX 1076[2] | 22.2 |

[1]MODAFLOW III is poly(ethyl-2-ethylhexyl) acrylate on silica carrier available from Monsanto Co.
[2]IRGANOX 1076 is a polyphenol stabilizer that inhibits oxidation available from Ciba-Geigy.

The carboxylic acid group-containing acrylic polymer and the carboxylic acid group-containing polyester were melted together in an oven at 350° F. (177° C.). The melt was then poured onto a bed of dry ice to solidify it and break it into chunks. The chunks were blended with tee other ingredients in the formulation in a planetary mixer and then melt blended in a Baker Perkins twin screw extruder at 130° C. The extrudate was chilled and flaked on a chill roll at 20° C., ground in a micromill and sieved through a 140-mesh screen. The resulting powder was then electrostatically sprayed onto grounded steel panels using an electrostatic spray gun. The coated panels were then baked at 177° C. to form hard glossy coatings. The properties of the resultant coating as well as the stability of the coating composition are reported in Table I below.

EXAMPLE 2

A pigmented powder coating composition was prepared from the following mixture of ingredients:

| Ingredients | Parts by Weight (grams) |
| --- | --- |
| Carboxylic acid group-containing acrylic polymer of Example A | 530.0 (55.8%) |
| Poly(dodecanedioic anhydride) of Example C | 100.0 (10.5%) |
| Carboxylic acid group-containing polyurethane of Example E | 170.0 (17.9%) |
| Beta-hydroxyalkylamide of Example F | 150.0 (15.8%) |
| Carbon black | 23.75 |
| TINUVIN 900[1] | 19.0 |
| TINUVIN 144[2] | 9.50 |
| IRGANOX 1076 | 14.25 |
| FC-430[3] | 3.80 |
| Benzoin | 7.60 |

[1]TINUVIN 900 is a substituted benzotriazole U.V. absorber available from Ciba-Geigy.
[2]TINUVIN 144 is a piperidinyl derivative U.V. absorber available from Ciba-Geigy.
[3]FC-430 is fluoropolymer flow control agents available from Minnesota Mining and Manufacturing Co.

The carboxylic acid group-containing acrylic polymer, polyanhydride, polyurethane and FC-430 were pre-extruded together in the Baker Perkins twin screw extruder at 110° C. The extrudate was chilled on a chill roll and broken into chunks which were then blended with the other ingredients in the formulation in a planetary mixer and then melt blended in the Baker Perkins twin screw extruder at 130° C. The extrudate was chilled and particulated, sprayed onto steel panels and cured as generally described in Example 1. The properties of the resultant coating are reported in Table I below.

EXAMPLE 3

A pigmented powder coating composition was prepared from the following mixture of ingredients:

| Ingredients | Parts by Weight (grams) |
| --- | --- |
| Carboxylic acid group-containing acrylic polymer of Example A | 560.0 (55.8%) |
| Dodecanediolic acid | 100.0 (10.0%) |
| Carboxylic acid group-containing polyurethane of Example E | 176.0 (17.6%) |
| Beta-hydroxyalkylamide of Example F | 167.0 (16.6%) |
| Carbon black | 25.8 |
| TINUVIN 900 | 20.06 |
| TINUVIN 144 | 10.03 |
| IRGANOX 1076 | 15.05 |
| FC-430 | 1.50 |
| Benzoin | 8.02 |

All the ingredients mentioned above with the exception of the beta-hydroxyalkylamide and the carbon black were melted together in an oven at 350° F. (177° C.). The melt was poured onto a bed of dry ice to solidify it and break it into chunks which were then pre-extruded in the Baker Perkins twin screw extruder at 100° C. The extrudate was chilled on a chill roll and broken into chunks which were blended with the beta-hydroxyalkylamide and the carbon black in a planetary mixer followed by melt blending in the Baker Perkins twin screw extruder at 130° C. The extrudate was chilled, particulated, sprayed onto steel panels and cured as generally described in Example 1. The properties of the coating are reported in Table I below.

EXAMPLE 4

A pigmented powder coating composition was prepared from the following mixture of ingredients:

| Ingredients | Parts by Weight (grams) |
| --- | --- |
| Carboxylic acid group-containing acrylic polymer of Example A | 700.0 (70.0%) |
| Poly(dodecanedioic anhydride) | 120.0 (12.0%) |
| Beta-hydroxyalkylamide of Example F | 180.0 (18%) |
| Carbon black | 25.0 |
| TINUVIN 900 | 20.0 |
| TINUVIN 144 | 10.0 |
| IRGANOX 1076 | 15.0 |
| FC-430 | 2.0 |
| Benzoin | 8.0 |

All the ingredients with the exception of the carbon black and the beta-hydroxyalkylamide were melt blended at 100° C. in the Baker Perkins twin screw extruder. The extrudate was chilled and broken into chunks which were blended with the beta-hydroxyalkylamide and the carbon black in a planetary mixer followed by melt blending in the Baker Perkins twin screw extruder at 130° C. The extrudate was chilled, particulated, sprayed onto steel panels and cured as generally described in Example 1. The properties of the resultant coating are reported in Table I below.

EXAMPLE 5

A pigmented powder coating composition was prepared from the following mixture of ingredients:

| Ingredients | Parts by Weight (grams) |
| --- | --- |
| Carboxylic acid group-containing acrylic polymer of Example B | 3209.50 |
| Dodecanedioic acid | 874.50 |
| Carboxylic acid group-containing polyester of Example D | 378.60 |
| Liquid MODAFLOW[1] | 46.4 |

[1]Liquid MODAFLOW is poly(ethyl-2-ethylhexyl) acrylate available from Monsanto Co.

The ingredients were melted in an oven at 350° F. (177° C.). The melt was poured onto a bed of dry ice to solidify it and break it into chunks which were blended in a planetary mixer with the following ingredients:

| Ingredients | Parts by Weight (grams) |
| --- | --- |
| Solidified melt | 557 |
| Poly(dodecanedioic anhydride) | 36.0 |
| Beta-hydroxyalkylside of Example F | 115.20 |
| Titanium dioxide | 145.0 |
| Carbon black | 1.50 |
| TINUVIN 900 | 14.50 |
| TINUVIN 144 | 7.30 |
| IRGANOX 1076 | 10.80 |
| Benzoin | 5.00 |
| AEROSIL 200[1] | 1.40 |

[1]Fumed silica available from Degussa Inc.

After blending in a planetary mixer, the blend was melt blended in the Baker Perkins twin screw extruder at 130° C. The extrudate was chilled, particulated, sprayed onto steel panels and cured as generally described in Example 1. The properties of the coating are reported in Table I below.

TABLE I

| Example No. | Stability[1] | Initial Gloss[2] 20° | Initial Gloss[2] 60° | Impact Resistance[3] in inch-pounds (coating thickness, in mils) Direct | Impact Resistance[3] in inch-pounds (coating thickness, in mils) Reverse | Mandrel Bend[4] | Pencil Hardness[5] | Solvent Resistance[6] | Salt Spray[7] 500 hours | Salt Spray[7] 1000 hours | Gloss After 500 Hours QUV Exposure[8] 20° | Gloss After 500 Hours QUV Exposure[8] 60° |
|---|---|---|---|---|---|---|---|---|---|---|---|---|
| 1 | excellent | 80 | 94 | 55 (1.6) | 40 (1.6) | 0"/0" | 3H | good | 1/16" | ¼" | 2 | 26 |
| 2 | excellent | 80 | 89 | 30 (2.0) | 5 (2.0) | 0"/0" | 3H | excellent | 0 | ¼" | 75 | 87 |
| 3 | excellent | 75 | 94 | 45 (2.0) | 5 (2.0) | 0"/0" | 3H | excellent | 1/16" | ¼" | 80 | 92 |
| 4 | excellent | 87 | 95 | 35 (3.0) | 35 (3.0) | 0"/0" | 3H | excellent | 0 | — | 80 | 92 |
| 5 | excellent | 63 | 44 | 160 (1.6) | 80 (1.6) | 0"/0" | 3H | good | ¼" | — | — | — |

[1] Stability was determined by placing a sample of the powder coating in a 2 oz. glass jar and immersing in a water bath at 43° C. If there was no evidence of caking or clumping after 48 hours, a good rating was given. If there was no caking or clumping after 168 hours, an excellent rating was given.
[2] The 20° and 60° gloss were measured with gloss meters manufactured by the Gardner Instrument Company.
[3] The impact resistance was measured with a Gardner Impact Tester. The coated panels were subjected to increasing amounts of impact until the coating cracked. The panel was impacted on the coating side, i.e., direct impact, and also on the side of the coated panel opposite the coating, i.e., reverse impact. The results are reported in inch-pounds and the thickness of the coating in mils is shown in the parenthesis.
[4] The mandrel bend test is determined by bending coated panels (4" × 12") around a ⅛-inch mandrel and measuring cracking/delamination in inches along the bend line.
[5] Pencil hardness is deteremined by taking pencils of increasing hardness (from F to 4H) and attempting to etch a scribe mark in the coating. The softest pencil which will etch the coating is reported as the pencil hardness for the film.
[6] Solvent resistance is determined by resistance to xylene. A cloth saturated with xylene is rubbed back and forth (double rub) using normal hand pressure over the cured coating. An excellent rating indicates the coating withstood at least 100 double rubs without dulling the coating. A good rating is for 50 double rubs. If less than 50 double rubs mars the coating, a failure is given.
[7] The salt spray corrosion resistance was measured by scribing the cured coated panels with an "X" and exposing the scribed panels to a salt spray fog at 100° F. (38° C.) as generally described in ASTM D-117 for 500 and 1,000 hours. The panels were removed from the chamber, dried, the scribe mark taped with masking tape, the tape pulled off at a 45° angle and the creepage from the scribe mark measured.
Creepage is the rusted darkened area of the panel where the coating has lifted from the panel surface.
[8] QUV exposure is determined by exposing the coated panels to alternating cycles of U.V. light and condensing humidity in a Q-U-V-Accelerated Weathering Tester manufactured by the Q-Panel Co. The U.V. light is generated with a UVB313 lamp (320–280 nanometers). The temperature of the U.V. light cycle is 70° C. The temperature of the condensing humidity cycle is 50° C.

The following examples are thermosetting clear powder coating compositions prepared with different beta-hydroxyalkylamide curing agents.

EXAMPLE 6

A clear powder coating composition was prepared from the following mixture of ingredients:

| Ingredients | Parts by Weight (grams) |
|---|---|
| Carboxylic acid group-containing acrylic polymer of Example B | 75 (65.3%) |
| Dodecanedioic acid | 15.0 (13.0%) |
| Bis[N,N-(beta-hydroxyethyl)]sebacamide of Example G | 25.0 (21.7%) |
| IRGANOX 1076 | 1.5 |
| Benzoin | 0.7 |
| SURFYNOL 104[1] | 1.5 |

[1] Acetylenic alcohol from Air Products and Chemicals Co.

The carboxylic acid group-containing acrylic polymer and the dodecanedioic acid were melted together in an oven at 350° F. (177° C.). The melt was then poured onto a bed of dry ice to solidify it and break it into chunks which were blended with the other ingredients in a planetary mixer and then melt blended in a Baker Perkins twin screw extruder at 130° C. The extrudate was chilled, particulated, sprayed onto aluminum panels and cured as generally described in Example 1. The resultant coating had good solvent resistance, excellent appearance, impact resistance and gloss retention after 500 hours QUV exposure.

EXAMPLE 7

A clear powder coating composition was prepared from the following mixture of ingredients:

| Ingredients | Parts by Weight (grams) |
|---|---|
| Carboxylic acid group-containing acrylic polymer of Example A | 60.0 (60.4%) |
| Dodecanedioic acid | 15.0 (15.1%) |
| Beta-hydroxyalkylamide of Example F | 18.8 (18.9%) |
| Beta-hydroxyalkylamide of Example H | 5.5 (0.6%) |
| MODAFLOW[1] | 0.8 |
| Benzoin | 0.8 |
| IRGANOX 1076 | 2.0 |

[1] MODAFLOW was poly(ethyl-2-ethylhexyl) acrylate available from Monsanto Co.

The ingredients were blended together and formulated into a powder, sprayed onto aluminum panels and cured as generally described in Example 6. The resultant coating had excellent solvent resistance, appearance and impact resistance (160 inch-pounds direct at coating thickness of 2.0 mils).

EXAMPLE 8

A pigmented powder coating composition was prepared from the following ingredients:

| Ingredients | Parts by Weight (grams) |
|---|---|
| Carboxylic acid group-containing acrylic polymer of Example B | 492.7 |
| Crystalline carboxylic acid group-containing polyester of Example H | 30.8 |
| Beta-hydroxyalkylamide of Example N | 74.4 |
| Organic red pigment[1] | 43.3 |
| Organic orange pigment[2] | 11.4 |
| Titanium dioxide | 6.7 |
| Organic yellow pigment[2] | 10.3 |
| MODAFLOW III | 6.9 |
| Benzoin | 4.5 |

[1] Available as F3RK70 from Hoeschst Corporation.
[2] Available from Hoeschst Corporation.

The carboxylic acid group-containing acrylic polymer and the low molecular weight carboxylic acid group-containing polyester were melted together at 375° F. (191° C.), stirred and cooled to a solid mass. The solid mixture was broken into chunks, blended in a high-intensity mixer with the other ingredients of the formulation and then melt blended in a Baker Perkins twin screw extruder t 130° C. The extrudate was chilled, flaked and ground in a micromill. The powder was sieved through a 140-mesh screen. The resultant powder was then electrostatically sprayed onto grounded steel panels. The coated panels were baked at 375° F. (191° C.) for 20 minutes to form hard glossy coatings. The properties of the resultant coating as well as the stability of the coating composition are reported in Table II below.

EXAMPLE 9

A pigmented powder coating composition was prepared from the following mixture of ingredients:

| Ingredients | Parts by Weight (grams) |
| --- | --- |
| Carboxylic acid group-containing acrylic polymer of Example C | 316.0 |
| Crystalline carboxylic acid group-containing polyester of Example I | 93.2 |
| Carboxylic acid group-containing polyester of Example J | 90.8 |
| Beta-hydroxyalkylamide of Example N | 83.0 |
| Titanium dioxide | 176 |
| Ultramarine blue | 1.0 |
| Carbon black | 1.0 |
| Benzoin | 4.0 |
| Synthron X270 flow agent[1] | 5.4 |
| Diperbyk 130 wetting agent[2] | 5.0 |

[1] A polyacrylate flow additive available from Synthron Company.
[2] Available from Byk-Mallinckrodt Industries.

The carboxylic acid group-containing materials were melted together, stirred, cooled and broken into chunks. The ingredients of the formulation were then blended in a high-intensity mixer, followed by melt-blending in a Baker Perkins twin screw extruder at 280° F. (138° C.). The extrudate was chilled, flaked, ground and sieved as before. The resultant powder was electrostatically sprayed onto ground steel panels. The coated panels were baked at 350° F. for about 20 minutes to form hard, glossy coatings. The properties of the resultant coatings are reported in Table II below.

TABLE II

| Example No. | Stability | Initial Gloss 20° | Initial Gloss 60° | Impact Resistance in inch-pounds (coating thickness, in mils) Direct | Impact Resistance in inch-pounds (coating thickness, in mils) Reverse | Pencil Hardness | Salt Spray 500 hours | Gloss After 500 Hours QUV Exposure 20° | Gloss After 500 Hours QUV Exposure 60° |
| --- | --- | --- | --- | --- | --- | --- | --- | --- | --- |
| 8 | gritty | 90 | 103 | 30 (1.9) | 5 (1.9) | 2H | — | 4.5 | 27 |
| 9 | good | 73 | 90 | 160 (2.5) | 160 (2.6) | 2H | ⅛" | — | — |

We claim:

1. A thermosetting powder coating composition comprising a co-reactable particulate mixture of:
   (a) 35 to 85 percent by weight of the entire composition based on weight of resin solids of a first carboxylic acid group-containing acrylic polymer having a Tg in the range of about 35° C. to 100° C.;
   (b) from about 1 to 25 percent by weight of the entire composition based on weight of resin solids of a carboxylic acid group-containing polyester having a number average molecular weight from about 300 to about 1500 and an acid equivalent weight of from about 150 to about 750, said polyester being crystalline at temperatures under 50° C., for assisting flow of the powder coating composition;
   (c) a beta-hydroxyalkylamide curing agent, the equivalent ratio of beta-hydroxyalkylamide equivalents to carboxylic acid equivalents being within the range of about 0.6 to 1.6:1; and
   (d) an amorphous acid group-containing polymer comprising a carboxylic acid group-containing polyester.

2. The composition of claim 1 in which the carboxylic acid group-containing polymer of component (b) is present in the composition in amounts of about 5 to 20 percent by weight of the entire composition based on total weight of resin solids.

3. The composition of claim 1 in which the acrylic polymer has a number average molecular weight within the range of 1,500 to 15,000.

4. The composition of claim 1 in which the acrylic polymer is formed from polymerizing an alpha, beta-ethylenically unsaturated carboxylic acid selected from the class consisting of acrylic acid and methacrylic acid, a $C_1$ to $C_{20}$ alkyl ester of acrylic acid or $C_1$ to $C_{20}$ alkyl ester of methacrylic acid including mixtures of such esters and a polymerizable vinyl aromatic compound.

5. The composition of claim 1 wherein the polyester of component (b) is the reaction product of a $C_4$ to $C_{20}$ dicarboxylic acid and an aliphatic diol at an equivalent ratio of acid to alcohol of about 3:2 to about 2:1.

6. The composition of claim 1 in which the beta-hydroxyalkylamide is of the structure:

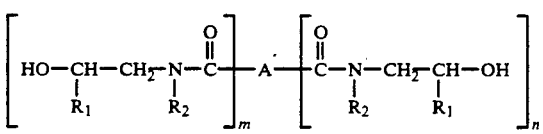

wherein $R_1$ is H or $C_1$-$C_5$ alkyl; $R_2$ is H, $C_1$-$C_5$ alkyl or

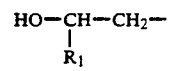

wherein $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms; m equals 1 to 2 and n equals 0 to 2 and m+n is at least 2.

7. The composition of claim 5 wherein the equivalent ratio of acid to alcohol in the reaction product of the dicarboxylic acid and aliphatic diol is about 2:1.

8. The composition of claim 1 wherein the polyester of component (b) melts in the range from about 50° C. to about 110° C.

* * * * *